Nov. 26, 1929.  F. H. RICHTERKESSING  1,736,801
ELECTRICAL CONTROL SYSTEM
Filed April 16, 1926
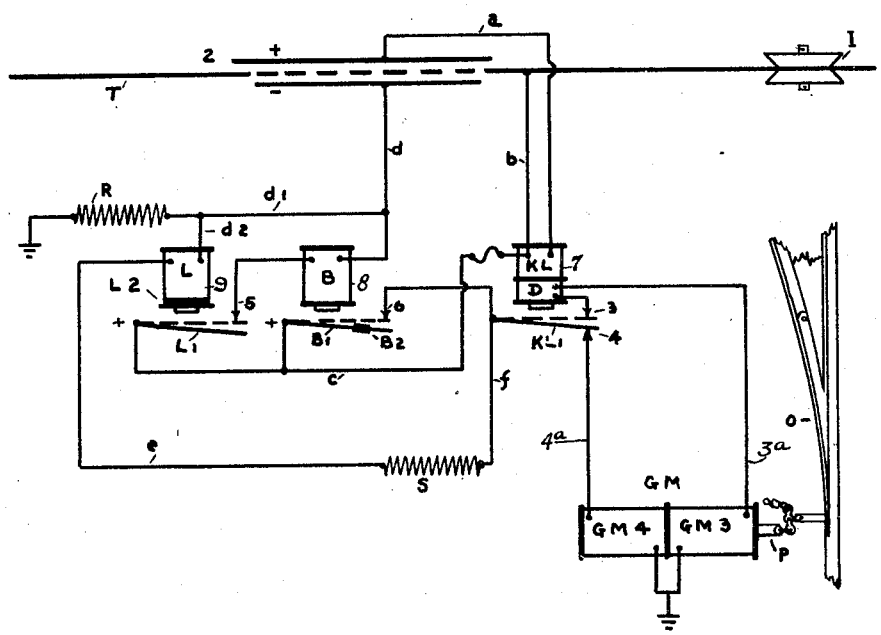
INVENTOR.
FRANK H. RICHTERKESSING
BY John L. Milton
ATTORNEY Patented Nov. 26, 1929

1,736,801

UNITED STATES PATENT OFFICE

FRANK H. RICHTERKESSING, OF LOUISVILLE, KENTUCKY, ASSIGNOR TO CHEATHAM ELECTRIC SWITCHING DEVICE COMPANY, OF LOUISVILLE, KENTUCKY

ELECTRICAL CONTROL SYSTEM

Application filed April 16, 1926. Serial No. 102,565.

The invention relates to electric control systems and has particular application to automatic electro-magnetic setting of the switch points of electric railway tracks in different positions in accordance with the approach of the car "under power" and "without power," respectively.

The object of the invention is to provide an improved electric control system to insure definite operation of a given apparatus under all possible operating circumstances and to eliminate objectional arcing at the operating contacts.

As heretofore constructed, electric switch operating control systems have required contact of the trolley wheel with the trolley contactor for an appreciable time period in order that complete saturation of the controlling relays and track solenoid should occur. This time period has been secured by a plurality of different ways, usually by making the trolley contactor parts of considerable length, or by limiting the speed of the car in passing the trolley contactor. The limitation of the speed of a car introduces the personal equation of the motorman to such an extent that the system could not be termed full automatic. It is, therefore, one of the objects of the invention to provide a circuit changer which is set in operation to control the switch operating means upon dis-engagement of the trolley wheel and trolley contactor. In a control system of this type, it is not necessary to work between the extreme limits to obtain the necessary time required for the operation of the various elements involved in the control system. Heretofore, control systems have required that the elements of the trolley contactor be so arranged that a succession of operations must be obtained upon contact of the trolley wheel with the contactor elements, only a small portion of the total contact time actually being used for controlling the most important element of the control system, the circuit changer or selector switch.

As applied to electric railway uses, my electric control system makes possible the use of a materially shorter and lighter trolley contactor, wherein the entire length of the trolley contactor (on the positive side) is used for the actual positioning of the circuit changer or selector switch before controlling the circuit closing means. Again my new control system utilizes the entire length of the trolley contactor (on the negative side) to fully saturate the relays or relay that would be used to control the circuit closing means upon dis-engagement of the trolley wheel and trolley contactor. In the circuit described herein, the relay in circuit with the negative side of the trolley contactor is of the slow release type, therefore, it is a very desirable feature to have the maximum time for the saturation of this relay, as it provides a definite time factor for the relay controlling the normal open circuit connecting the trolley conductor and track solenoid.

As a direct result of the growth of electric railway systems, larger cars are being placed in operation very rapidly. The addition of these larger cars in the railway systems introduces a problem that is very serious in the case of the control systems heretofore employed for automatic track switch operation. As it is quite evident to those skilled in the art of automatic switch operation, the larger cars are equipped with many new electric control devices, necessary for modern car operation, that these devices add considerable current to the auxiliary currents heretofore used by electric railway cars. As is the case with most every electric railway systems, they have added these modern cars to their systems and operate them in most every case, on lines that have the smaller or lighter type of electric railway cars operating. Where automatic switch operation is desired, on points thruout this line, older types of switch controls would be subjected to frequent switch failures. Practically every automatic switch control embodies the old system of track solenoid selection by "power on" or "power off." It is quite evident that the current used by the auxiliary circuits on the larger type cars approaches the maximum current that can be drawn on the smaller or lighter type cars. Since the amount of current used by the cars cannot be predetermined or controlled without introducing objectional features, the control systems must be designed to accomodate problems of this type.

My new control system reduces this margin between the current used by the small and large cars for operation of the circuit changer or selector switch, by "power on" or "power off". This feature is obtained by utilizing the maximum time available for the actual switch selection. For instance, the difference in the current drawn by the large car with the controller in the "off" position, and the small car with the controller in the "on" position drawing the maximum current possible, may be very small, but if sufficient time is available for the saturation of the circuit changer, it could be designed to function on a pre-determined current value and not operate on any other value regardless how less the smaller current value might me. This pre-determined current value would be of such quantity that the auxiliary currents on the large cars could not attain, but still be within the maximum current range of the small cars. This would give an absolute "on" and "off" controller position, in regards to the circuit changer or selector switch, for both the large and small cars.

Still another object of my invention, is to have a constant pre-determined value of time for switch operation that would be beyond the control of the car operator or any current collector that would engage therewith. And as a direct resultant of the system that I employ, it is impossible for the car operator to change the solenoid selection after the said circuit has been closed for the track switch operation.

A still further object of my invention is to provide a system, which will avoid the breaking of any currents by the current collector or trolley wheel which may be of sufficient magnitude to cause a destructive arc.

Another features of my invention is to provide a safer control system embodying relays and circuits of much simpler nature than heretofore used in combination with electric track switch operation. This feature is highly desirable for production and service.

In the accompanying drawings—

Fig. 1 is a circuit diagram illustrating the improved electric control system as applied to a track switching device as is commonly used for electric railways, some of the mechanical parts of the apparatus being conventionally represented.

I depend for the operation of my system upon the well known "power on" or "power off," the motor principle in which a collector or trolley wheel 1 mounted upon a car engages a trolley contactor 2 with "power off" to operate the switch in one direction, usually the "straight ahead" position, and in which the current collector or trolley wheel engages the trolley contactor 2 with "power on" to operate the switch tongue in the opposite direction, usually the "curve" direction. A car is usually provided with heaters, lights, air compressors and etc. that constitute the auxiliary currents of the car, also a controller to control the current flow to the car motors for operation of the car. The current collector or trolley wheel 1 is mounted upon the car by a trolley pole. The current flowing thru the auxiliary apparatus is not under the control of the car controller, and as this current may amount to considerable I take this fact into consideration in designing certain elements of my control system, as hereinafter described. When the car controller is in the "off" position no current will flow thru the car motors; but when the car controller is in the "on" position a very heavy current will flow thru the motors.

The overhead trolley wire, or trolley conductor a direct current electric railway system is shown in each diagram as T. The current collector or trolley wheel 1, for engaging the trolley contactor 2, is shown in Fig. 1. The trolley contactor 2 is mounted adjacent the trolley wire in such a manner that when the trolley wheel engages it, it is removed gradually from engagement with the trolley wire. This separation of the trolley wheel and trolley wire can be be very small, as no appreciable arc can occur at the contactor in any control system. + represents an electrical contact member that is connected to the trolley wire thru wire $a$, solenoid KL, wire $b$, to the trolley wire T. (+ is the positive side of the trolley contactor). − represents an electrical contact member of the trolley contactor 2, to which is connected conductor $d$, which makes connection with solenoid B, and forms the trolley contactor circuit for relay L, thru conductor $d^1$, conductor $d^2$, solenoid, L conductor $e$, resistor $s$, conductor $f$, armature $KL^1$ of relay KL—D, which operates between front contact 3 and back contact 4, the armature $KL^1$ normally forming a connection at back contact 4, completing the ground return for the relay L thru the track solenoid $GM^4$ to ground. When relay KL—D is energized the ground return for relay L is obtained when the armature $KL^1$ makes connection at front contact 3, completing the circuit thru track solenoid $GM^3$ to ground. Track solenoids $GM^3$, and $GM^4$, are so arranged and constructed to operate plunger P, which in turn operates the switch point O in accordance with the position of the armature $KL^1$. Wire $c$ establishes the connection between the armatures of $L^1$ of relay 9 and $B^1$ of relay 8, to the trolley wire T thru conductor b. Conductors $d$, $d^1$, and $d^2$ are connected making connection with resistor R completing the ground return for the relay B, which is operative upon dis-engagement of the trolley wheel and trolley contactor, obtaining its feed source from the armature $L^1$ of relay 9, thru conductor 5, solenoid B, conductor $d^1$, thence to resistor R, to ground.

Referring to Fig. 1, the trolley contactor 2, is mounted in fixed relation to the trolley wire T, and comprises two parallel contact members + and − which are normally insulated from each other, one being electrically connected to the trolley wire T, and the other normally out of electrical engagement with the trolley wire. The contact members are so arranged that they may be bridged by the current collector or trolley wheel 1, and when so bridged the trolley wheel will be out of engagement with the trolley wire T. When the trolley wheel engages the trolley contactor 2, forming contact on the members + and −, the member + is electrically connected to the trolley wire T and current is free to flow thru the trolley wheel 1, trolley pole, and the other car circuits to ground. If the trolley wheel engages the trolley contactor with "power on" current will flow thru the car motors, the amount of current flowing in that circuit being controlled by the car controller. If the trolley wheel 1, engages the trolley contactor 2, with "power off" no current will flow thru the car motors.

I employ an electrically operated track switch O, having a switch tongue, two operating solenoids $GM^4$, and $GM^3$, a plunger P, and a connecting rod connecting the track switch to the plunger. The solenoids $GM^4$ and $GM^3$ have one terminal connected to a common ground connection. When the solenoid $GM^4$ is energized the plunger P is drawn inwardly and being connected to the switch tongue of the track switch O by a connecting rod, the tongue is moved to the "straight ahead" position, and when the solenoid $GM^3$ is energized the plunger P is drawn outwardly and the switch tongue is moved to the "curve" or the opposite position, as shown in Fig. 1.

I also employ an electrical operated switch 7 having an operating coil KL, usually of heavy wire, as it must conduct current to the car motors when the trolley wheel engages the trolley contactor with "power on", and also if the car stands with the trolley wheel on the trolley contactor and then starts. One terminal of the coil KL is connected to the trolley wire T by the conductor $b$, and the other terminal is connected to the contact member + by the conductor $a$. The number of turns in the coil KL is so adjusted that the auxiliary car currents will not sufficiently energize the coil to raise the armature $KL^1$, but will be sufficiently energized by the current of the car motors when flowing in this circuit to raise the armature $KL^1$.

The switch 7 is provided with one front contact 3, and one back contact 4, and the contact 4 is normally in engagement with the armature $KL^1$. Back contact 4 is connected to track solenoid $GM^4$, and front contact 3 is connected to the holding coil D, thence to the track solenoid $GM^3$. This holding coil is wound of sufficient turns so that when current flows thru the track solenoid $GM^3$, the coil D will be energized and hold the armature $KL^1$ in contact with front contact 3 as long as current flows thru the solenoid $GM^3$ regardless of whether current continues to flow thru the coil KL. I also employ electrical operated switches 8 and 9. The switch 8 is provided with a coil B and the switch 9 is provided with a coil L. These coils, as well as the coils KL and D, are provided with a magnetic core, although the coils may be provided with a movable core secured to the armatures thereof if desired. One terminal of each coil 9 and 8 is connected together by the conductor $d^1$ and to the − element of the trolley contactor 2, by conductor $d$. The other terminal of coil B is connected to the front contact of relay 9 by conductor 5. The other terminal of coil L is connected to resistor $s$ by conductor $e$, thence to ground thru the track solenoids.

When the contact members + and − of the trolley contactor 2 are bridged by a current collector or trolley wheel 1 with "power off," current flows from the trolley conductor T, thru conductor $b$, solenoid KL, conductor $a$, to the + element of the trolley contactor 2, thru the current collector 1, to the contact member −, and from there thru the conductors $d$, $d^1$, $d^2$, solenoid L, conductor $e$, resistor $s$, conductor $f$, thru the armature $KL^1$, conductor $4^a$, to the track solenoid $GM^4$, to ground, simultaneously energizing the solenoid L. The solenoid L is of relatively high resistance and is included in a very high resistant circuit, therefore, only a very small current is present in this circuit at any time. As soon as the solenoid L is energized, its armature $L^1$ is raised into engagement with its front contact. Upon engagement of this contact, a positive potential is supplied to one of the terminals of the solenoid B, feeding from the trolley conductor T, thru conductor $b$, conductor $c$, and armature $L^1$ of relay 9; and since the other terminal of the solenoid B is of positive potential, getting its source from the trolley conductor T, thru conductor $b$, solenoid KL, conductor $a$, element + of the trolley contactor 2, thru the current collector 1, element − and conductor $d$, no current can be present in the solenoid B for energization. This condition will exist so long as the trolley contactor elements + and − are bridged by the current collector 1. However, upon dis-engagement of the current collector 1, and the trolley contactor 2, current will be free to flow from the armature $L^1$, thru the front contact of relay 9, conductor 5, solenoid B conductor $d^1$, resistor R, to ground, for the energization of the solenoid B; also, current will flow from the conductor $d^1$, thru conductor $d^2$, solenoid L, conductor $e$, resistor $s$, conductor $f$, thru $KL^1$, thru conductor $4^a$, to the track solenoid $GM^4$ to ground, retaining a very small current flow thru the solenoid L, providing a holding circuit for the relay 9 until the relay 8 has operated. As soon as the armature $B^1$ or relay 8 is brought into engagement with its front contact, current is fed to either of the track solenoids previously selected, for the energization of same, simultaneous with the closing of this circuit, a positive potenial is fed thru the conductor 6 to conductor $f$; hence, the solenoid L, of relay 9, is short circuited by means of armature $B^1$. The relay 9 is provided with a time lag factor, first due to the method employed in shunting it, and second due to the long follow-thru of its front contact; or I may employ, as shown in Fig. 1, a copper or brass slug $L^2$, about the core of solenoid L to retard the release of its armature $L^1$, as is well known; or I may employ other means to give the releasing of the armature $L^1$ a time lag, so as to permit a definite time period for the operation of the relay 8, which controls the current flow for the track solenoids $GM^4$ and $GM^3$. After the operation of the time period of relay 9, its armature $L^1$, is released, opening the circuit of solenoid B at its front contact, restoring the system to a normal open condition.

If in passing over the trolley contactor 2, the car operator should un-intentionally change his controller to "power on," the armature $KL^1$ of relay 7 would be brought into engagement with the front contact 3. This would not, however, create any change in the control system, inasmuch that there would be no current of sufficient magnitude to cause serious arcing at any point; because, in the control system herein described, the track solenoid circuit is not operative until after dis-engagement of the current collector and trolley contactor.

If the car operator desires to take the "curve," he will pass the trolley contactor with "power on," and when the current collector 1, engages the trolley contactor 2, the solenoid KL will be energized, thereby bringing the armature $KL^1$ into engagement with the front contact 3, and at the same time relay 9 will be operated, as heretofore described. Upon dis-engagement of the current collector 1, and the trolley contactor 2, the controlling relays will be permitted to operate to close the circuit of the track solenoid $GM^3$ for a pre-determined time interval.

The holding coil D operates to retain the armature $KL^1$ in engagement with its front contact 3, so long as current flows to the track solenoid $GM^3$. It is quite evident that the holding coil D can be replaced with a copper or brass slug about the core of solenoid KL, to retard the release of the armature $KL^1$, since there is ample time provided for the saturation of this relay in this control system.

It will be evident to those skilled in the art, that various modifications may be made in the parts, herein described, but which will still fall within the scope of my invention, as for instance, a rotary motor may be employed to operate the switch tongue, in place of the reciprocating motor shown.

What I claim is:

1. In an electric switch operating device, the combination with the track solenoid, trolley conductor and trolley contactor, of a normally open circuit connecting the trolley conductor and track solenoid, a circuit closing means therein, of means controlled by contact of a trolley with a trolley contactor for closing the circuit of an electrically controlled time element device controlling means to permit the operation of the circuit closing means upon dis-engagement of the trolley contact and trolley contactor.

2. In an electric switch operating device, the combination with the track solenoid, trolley conductor and trolley contactor, of a normally open circuit connecting the trolley conductor and track solenoid, a circuit closing means therein, of means controlled by contact of a trolley with a trolley contactor for closing the circuit of a normally de-energized retarded release relay permitting the operation of the circuit closing means upon dis-engagement of the trolley contact and trolley contactor.

3. In an electric switch operating device, the combination with the track solenoid, trolley conductor and trolley contactor, of a normally open circuit connecting the trolley conductor and track solenoid, a circuit closing means therein, of means controlled by contact of a trolley with a trolley contactor for closing the circuit of a normally de-energized retarded release relay permitting the operation of the circuit closing means for a pre-determined time upon dis-engagement of the trolley contact and trolley contactor.

4. In an electric switch operating device, the combination with the track solenoid, trolley conductor and trolley contactor, of a normally open circuit connecting the trolley conductor and track solenoid, a circuit closing means therein, of means controlled by contact of a trolley with a trolley contactor for closing the circuit of a normally de-energized retarded release relay permitting the operation of the circuit closing means for a pre-determined time upon dis-engagement of the trolley contact and trolley contactor but rendering the circuit closing means inoperative when de-energized, and means provided for releasing the said relay controlled by the trolley contact.

5. In an electric switch operating device, the combination with the track solenoid, trolley conductor and trolley contactor, of a normally open circuit connecting the trolley conductor and track solenoid, a circuit closing means therein, of means controlled by contact of a trolley with a trolley contactor for closing the circuit of a normally de-energized retarded release relay permitting the operation of the circuit closing means for a pre-determined time upon dis-engagement of the trolley contact and trolley contactor and means provided for retaining the energization of the first mentioned relay until the circuit closing means has operated.

6. In an electric switch operating device, the combination with the track solenoid, trolley conductor and trolley contactor, of a normally open circuit connecting the trolley conductor and track solenoid, a circuit closing means therein, of means controlled by contact of a trolley with a trolley contactor for closing the circuit of a normally de-energized retarded release relay permitting the operation of the circuit closing means for a pre-determined time upon dis-engagement of the trolley contact and trolley contactor, means provided for retaining the energization of the first mentioned relay until the circuit closing means has operated and means provided for releasing the said relay controlled by the trolley contact.

7. In an electric switch operating device, the combination with the track solenoid, trolley conductor and trolley contactor, a trolley contactor control circuit, of a normally open circuit connecting the trolley conductor and the track solenoid, a circuit closing means therein, means not included in the trolley contactor control circuit operable upon disengagement of the trolley contact and trolley contactor to control the circuit closing means.

8. In an electric switch operating device, the combination with the track solenoid, trolley conductor and trolley contactor, a trolley contactor control circuit, of a normally open circuit connecting the trolley conductor and track solenoid, a circuit closing means therein, means not included in the trolley contactor circuit operable upon dis-engagement of the trolley contact and trolley contactor to control the circuit closing means for a pre-determined time.

9. In an electric switch operating device, the combination with the track solenoid, trolley conductor and trolley contactor, a trolley contactor control circuit, of a normally open circuit connecting the trolley conductor and track solenoid, a circuit closing means therein, means not included in the trolley contactor circuit operable upon dis-engagement of the trolley contact and trolley contactor to control the circuit closing means for a pre-determined time and restore the system to a normal condition.

10. In an electric switch operating device, the combination with the track solenoid, trolley conductor and trolley contactor of a normally open circuit connecting the trolley conductor and track solenoid, a circuit closing means therein, a current collector to engage the trolley contactor, of means controlled by contact of the current collector and trolley contactor for closing the circuit of a normally de-energized retarded release relay permitting the operation of the circuit closing means upon dis-engagement of the trolley contact and trolley contactor regardless of the position of the trolley contact.

11. In an electric switch operating device, the combination with the track solenoid, trolley conductor and trolley contactor, of a normally open circuit connecting the trolley conductor and track solenoid, a circuit closing means therein, of means controlled by contact of a trolley with a trolley contactor for closing the circuit of a normally de-energized retarded release relay permitting the operation of a relay upon dis-engagement of the trolley contact and trolley contactor, to control the circuit closing means.

12. In an electric switch operating device, the combination with the track solenoid, trolley conductor and trolley contactor, of a normally open circuit connecting the trolley conductor and track solenoid, a circuit closing means therein, of means controlled by contact of a trolley with a trolley contactor for closing the circuit of a normally de-energized retarded release relay permitting the operation of a relay, for a pre-determined time, upon dis-engagement of the trolley contact and trolley contactor, to control the circuit closing means.

13. In an electric switch operating device, the combination with the track solenoid, trolley conductor and trolley contactor, of a normally open circuit connecting the trolley conductor and track solenoid, a circuit closing means therein, a current collector to engage the trolley contactor, of means controlled by contact of the current collector and trolley contactor for closing the circuit of a normally de-energized retarded release relay, a shunt provided preventing the operation of the circuit closing means until dis-engagement of the current collector and trolley contactor.

14. In an electric switch operating device, the combination with the track solenoid, trolley conductor and trolley contactor of a normally open circuit connecting the trolley conductor and track solenoid, a circuit closing means therein, a current collector to engage the trolley contactor, of means controlled by contact of the current collector and trolley contactor for closing the circuit of a normally de-energized retarded release relay, a shunt provided preventing the operation of the relay controlling the circuit closing means until dis-engagement of the current collector and trolley contactor, wherein a shunt is provided to restore the first mentioned relay to a normal condition.

15. In an electric switch operating device, the combination with the track solenoid, trolley conductor and trolley contactor, of a normally open circuit connecting the trolley conductor and track solenoid, a circuit closing means therein, a relay in circuit with the trolley contactor to control the operation of the circuit closing means upon disengagement of the trolley contact and trolley contactor.

16. In an electric switch operating device, the combination with the track solenoid, trolley conductor and trolley contactor, of a normally open circuit connecting the trolley conductor and track solenoid, a circuit closing means therein, a relay in circuit with the trolley contactor to control the operation of the circuit closing means upon dis-engagement of the trolley contact and trolley contactor, wherein means, not included in the trolley contactor circuit are provided to release the first mentioned relay.

17. In an electric switch operating device, the combination with the track solenoid, trolley conductor and trolley contactor, of a normally open circuit connecting the trolley conductor and track solenoid, a circuit closing means therein, a relay in circuit with the trolley contactor, a second relay in series with the said first relay operable only upon dis-engagement of the trolley contact and trolley contactor to control the circuit closing means.

18. In an electric switch operating device, the combination with the track solenoid, trolley conductor and trolley contactor, of a normally open circuit connecting the trolley conductor and track solenoid, a circuit closing means therein, a retarded release relay in circuit with the trolley contactor having only one front contact to provide a circuit thru the windings of a second relay in series with the said first relay operable only upon dis-engagement of the trolley contact and trolley contactor to control the circuit closing means.

19. In an electric switch operating device, the combination with the track solenoid, trolley conductor and trolley contactor, of a normally open circuit connecting the trolley conductor and track solenoid, a circuit closing means therein, a retarded release relay in circuit with the trolley contactor having only one front contact to provide a circuit thru a second relay for a pre-determined time upon dis-engagement of the trolley contact and trolley contactor to control the circuit closing means.

20. In an electric switch operating device, the combination with the track solenoid, trolley conductor and trolley contactor, of a normally open circuit connecting the trolley conductor and track solenoid, a circuit closing means therein, a retarded release relay in circuit with the trolley contactor to control the relay controlling the circuit closing means for a pre-determined time upon dis-engagement of the trolley contact and trolley contactor but rendering the second mentioned relay in-operative until dis-engagement of the contact elements.

21. In an electric switch operating device, the combination with the track solenoid, trolley conductor and trolley contactor, of a normally open circuit connecting the trolley conductor and track solenoid, a circuit closing means therein, a normally de-energized retarded release relay in circuit with the trolley contactor for controlling the circuit of the circuit closing means for a pre-determined time upon dis-engagement of the trolley contact and trolley contactor, wherein automatic means are operable to restore the first mentioned relay to a normal condition.

22. In an electric switch operating device, the combination with the track solenoid, trolley conductor and trolley contactor of a normally open circuit connecting the trolley conductor and track solenoid, a retarded release relay in circuit with the trolley contactor, a second relay in series with the first mentioned relay operable upon dis-engagement of the trolley contact and trolley contactor to provide a shunt for the first mentioned relay and close the normally open circuit connecting the trolley conductor and track solenoid for a definite time interval.

23. In an electric switch operating device, the combination with the track solenoid, trolley conductor and trolley contactor, of a normally open circuit connecting the trolley conductor and track solenoid, a circuit closing means therein, a current collector to engage the trolley contactor, means controlled by contact of the current collector and trolley contactor for closing the circuit of a normally de-energized retarded release relay controlling the circuit of the relay controlling the circuit closing means, the latter relay having only one front contact to close the normal open circuit connecting the trolley conductor and track solenoid and release the first mentioned relay, the second mentioned relay being rendered in-operative until dis-engagement of the current collector and trolley contactor.

24. In an electric switch operating device, the combination with the track solenoid, trolley conductor and trolley contactor of a normally open circuit connecting the trolley conductor and track solenoid, a circuit closing means therein, a circuit changer operable upon the said circuit to direct current into the different parts of the track solenoid, a relay not in circuit with the trolley contactor operable only upon dis-engagement of the trolley contact and trolley contactor to control the circuit closing means.

25. In an electric switch operating device, the combination with the track solenoid, trolley conductor and trolley contactor, of a normally open circuit connecting the trolley conductor and track solenoid, a circuit closing means therein, a circuit changer operable upon the said circuit to direct current into the different parts of the track solenoid, a relay for controlling the circuit closing means for a pre-determined time upon dis-engagement of the trolley contact and trolley contactor, and means provided for retaining one selection of the circuit until the circuit closing means has operated.

26. In an electric switch operating device, the combination with the track solenoid, trolley conductor and trolley contactor, a trolley contactor control circuit of a normally open circuit connecting the trolley conductor and track solenoid, a circuit closing means therein, a circuit changer operable upon the said circuit to direct current into the different parts of the track solenoid, the circuit changer having an operating coil and a holding coil, the holding coil of the circuit changer being included in a branch of the normally open circuit, means not included in the trolley contactor control circuit operable upon dis-engagement of the trolley contact and trolley contactor, to control the circuit closing means and direct current into the solenoid branch last selected.

27. In an electric switch operating device, the combination with the track solenoid, trolley conductor and trolley contactor, a trolley contactor control circuit of a normally open circuit connecting the trolley conductor and track solenoid, a circuit closing means therein, a current collector to engage the trolley contactor, circuits connecting the various parts for controlling a time element relay upon engagement and disengagement of the current collector and trolley contactor, and means not included in the trolley contactor control circuit operable upon dis-engagement of the current collector and trolley contactor to render the first mentioned means temporarily in-operative and close the normal open circuit connecting the trolley conductor and track solenoid for a pre-determined time regardless of the position of the current collector.

28. In an electric switch operating device, the combination with the track solenoid, trolley conductor and trolley contactor, a trolley contactor control circuit of a normally open circuit connecting the trolley conductor and track solenoid, a circuit closing means therein, a current collector to engage the trolley contactor, a normally de-energized retarded release relay in circuit with the trolley contactor, a circuit closing relay in series with the first mentioned relay, but not included in the trolley contactor control circuit, a shunt provided to render the second mentioned relay in-operative until dis-engagement of the current collector and trolley contactor wherein the controlling circuits of the said retarded release relay become de-energized and the circuit closing relay in-operative after a pre-determined time.

29. In an electric switch operating device, the combination with the track solenoid, trolley conductor and trolley contactor of a normally open circuit connecting the trolley conductor and track solenoid, a circuit closing means therein, means applied in a control system permitting the operation of the circuit closing means for a pre-determined time upon dis-engagement of the trolley contact and trolley contactor, by placing a low resistance shunt about the operating coil of the circuit closing means.

30. In an electric switch operating device, the combination with the track solenoid, trolley conductor and trolley contactor, of a normally open circuit connecting the trolley conductor and track solenoid, a circuit closing means therein, a circuit changer operable upon the said circuit to direct current into the different parts of the track solenoid, a relay for controlling the circuit closing means for a pre-determined time upon disengagement of the trolley contact and trolley contactor, and means cooperative wherein the said circuit changer is operative upon contact engagement of the said trolley contact and trolley contactor.

31. The combination with a contactor and a traveling contact element co-operating therewith, a circuit changer for directing current into the different branches, of switch operating means operable upon dis-engagement of said traveling contact element and contactor, and an auxiliary circuit connected to the circuit changer and said contactor to control the circuit controlling said switch operating means.

32. In an electrical switch operating device, the combination of a switch controlling circuit, a trolley contactor and a traveling current collector adapted to control said switch controlling circuit, a switch operating circuit which is effective only when said switch controlling circuit becomes de-energized, to control a relay for controlling the switch operating circuit upon disengagement of the current collector and trolley contactor.

FRANK H. RICHTERKESSING.